United States Patent [19]

Dailey

[11] Patent Number: 4,825,581

[45] Date of Patent: May 2, 1989

[54] BAIT STATION FOR RODENTS AND THE LIKE

[76] Inventor: Jack H. Dailey, 348 Summit, Rockford, Mich. 49341

[21] Appl. No.: 115,206

[22] Filed: Nov. 2, 1987

[51] Int. Cl.$^4$ .......................................... A01M 25/00
[52] U.S. Cl. ...................................................... 43/131
[58] Field of Search ................................ 43/124, 131

[56] References Cited

U.S. PATENT DOCUMENTS

| | | | |
|---|---|---|---|
| 794,323 | 7/1905 | Small | 43/131 |
| 886,934 | 5/1908 | Bradford | 43/131 |
| 1,086,610 | 2/1914 | Nunes | 43/131 |
| 1,321,360 | 11/1919 | Bright | 43/131 |
| 2,714,780 | 8/1955 | Glover | 43/131 |
| 2,896,362 | 7/1959 | Wingate | 43/131 |
| 3,225,485 | 12/1965 | Powell | 43/131 |
| 4,026,064 | 5/1977 | Baker | 43/131 |
| 4,619,071 | 10/1986 | Willis | 43/131 |

Primary Examiner—Kurt Rowan
Attorney, Agent, or Firm—Price, Heneveld, Cooper, DeWitt & Litton

[57] ABSTRACT

A bait station for rodents and the like comprises a hollow housing shaped to admit a plurality of rodents therein, and includes an access opening adapted to service the bait station. The access opening is selectively closed by a closure having a releasable lock to prevent inadvertent opening of the access opening. Mounted within the housing is a partition having a substantially horizontal orientation, and dividing at least a portion of the housing into upper and lower levels. An entry aperture is disposed in the lower level of the housing, and is shaped to permit rodents to enter and exit the bait station therethrough. A first feed bin is positioned in the lower level of the housing at a first feed area disposed remote from the entry aperture. A second feed bin is positioned in the upper level of the housing at a second feed area. A passageway shaped to permit rodents to ambulate therethrough extends from the first feed area in the lower level of the housing to a location in the upper level of the housing, remote from the second feed area. The passageway allows the rodents to travel freely between the upper and lower levels of the housing for increased rodent feeding, while alleviating the tracking of bait from the bait station.

21 Claims, 2 Drawing Sheets

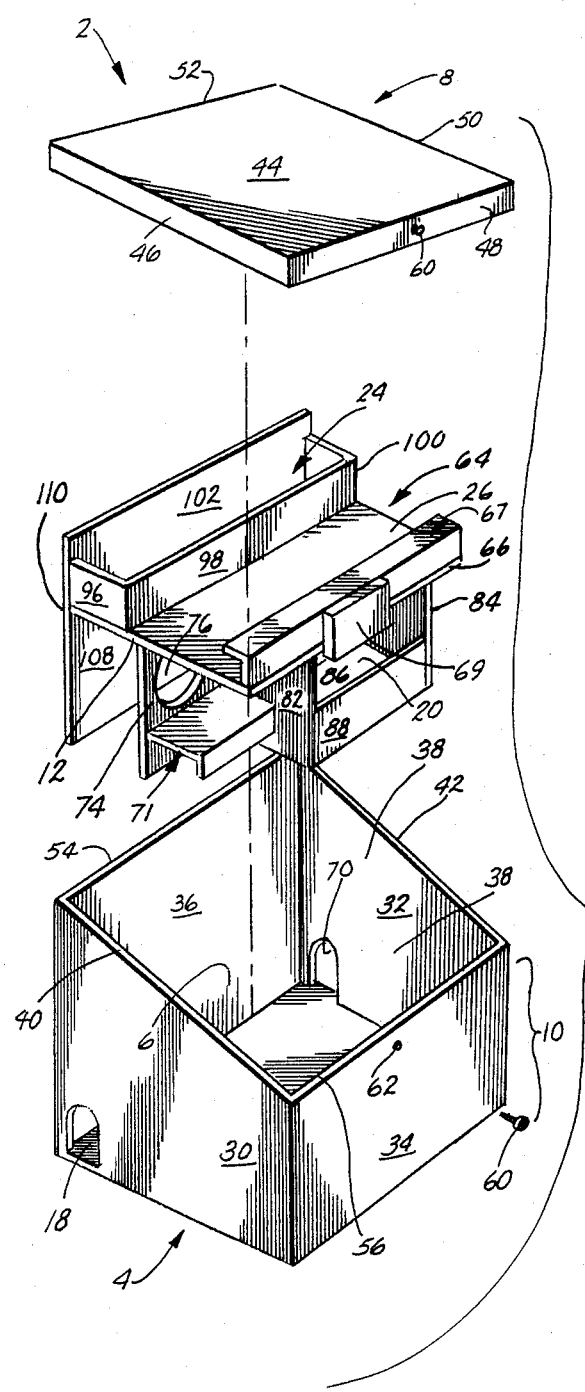
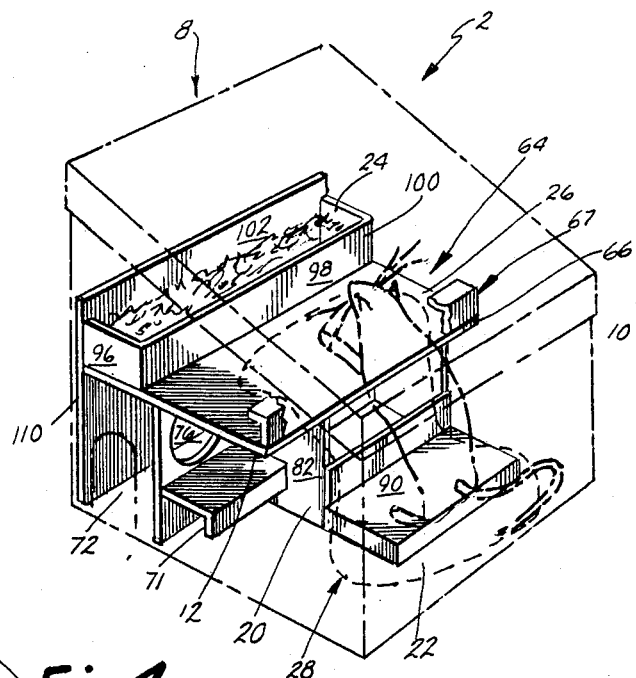
Fig. 4.
Fig. 5.

BAIT STATION FOR RODENTS AND THE LIKE

BACKGROUND OF THE INVENTION

The present invention relates to rodent bait stations and and the like, and in particular to a serviceable rodent feed station that is convenient to maintain and provides multiple feed areas, without increased tracking of the bait.

Conventional rodent feed stations typically comprise an enclosed housing having at least one aperture and a feed bin therein. Such feed stations normally provide a feed bin which is located on a single level and has rather limited space. This sort of conventional feed station is not ideally suited for rodent feeding since rodents tend to be "social" vermin that often travel in groups. When too many rodents feed in a station of rather limited space, the possibility of tracking bait out of the station is increased. Tracking of bait poses a grave danger to those who unsuspectingly encounter the displaced bait, which is generally poisonous and lethal. In other words, tracking of bait out of the bait station, which is viewed as unacceptable by the Environmental Protection Agency, potentially exposes children, pets and others to the poisonous bait. Additionally, the wall between the entry aperture and the feed bin as well as the feed bin itself are not integrally connected into a single unit so that the interior of the housing can be disassembled in a few, simple steps. Hence, there is a need for a rodent bait station which can accommodate many rodents for purposes of feeding at more than one bin o more than one level. At the same time, the multi-level rodent bait station should be easy to disassemble for convenient servicing and maximum operability.

SUMMARY OF THE INVENTION

A bait station for rodents and the like comprises a hollow housing shaped to admit a plurality of rodents therein, and includes an access opening adapted to service the bait station A partition, mounted in the housing in a substantially horizontal orientation, divides the housing into upper and lower levels. An entry aperture is disposed in the lower level of the housing, and is shaped to permit rodents to enter and exit the bait station therethrough. A first feed bin is positioned in the lower level of the housing at a first feed area disposed remote from the entry aperture, and a second feed bin is positioned in the upper level of the housing at a second feed area. A passageway, which is shaped to permit rodents to ambulate therethrough, extends from the first feed area in the lower level of the housing to a location in the upper level of the housing, remote from the second feed area. The passageway is disposed within the housing, so that rodents may travel freely between the upper and lower levels of the housing for increased rodent feeding, while alleviating the tracking of bait from the bait station.

Another aspect of the present invention is a unified interior partition assembly which is slidably received in a hollow housing to facilitate quick and easy maintenance. The housing includes a base, and a plurality of sidewalls upstanding therefrom. The partition includes a free edge positioned a preselected spaced apart distance from an associated one of the sidewalls to define an open portion of the passageway through which the rodents travel between the upper and lower portions of the housing. The partition free edge is positioned directly above the first feed area, and a step is positioned on the first level of the housing directly below the partition opening to assist rodents in climbing between the first and second levels of the housing. A wall, which extends between the first and second levels, and is disposed between the entry aperture and the first feed area, includes an aperture shaped slightly larger than the rodents to further alleviate the tracking of bait from the bait station. The partition, feed bins, and wall including an aperture are interconnected to form a removable unit that allows for periodic maintenance of the bait station by convenient removal of the unit. The removable unit is held in place by the step which abuts the first feed bin. The closure is preferably inclined so as to gravitationally shed rain, snow or the like.

The principal objects of the present invention are to provide a rodent bait station with increased feeding area to accommodate social rodents without increasing tracking of bait from the station. The bait station has a two-tier construction that can accommodate an increased number of rodents. A passageway, which preferably includes a step disposed proximately to the free edge of the partition allows easy access for the rodents between the first and second levels, and the first feed bin is conveniently removed from the passageway thus facilitating easy flow of rodents therethrough. By providing a second feed bin on the second level, more rodents are able to feed in the bait station since two distinct feeding areas are made available. The wall, which is disposed between the entry aperture and the first feed area further segregates the feed bins from the entry aperture so that the possibility of tracking bait from the bait station is minimized, and the tamper-proof slanted closure protects the housing from moisture and the like. The rodent bait station, which fully complies with EPA standards, has an uncomplicated construction and is particularly economical to manufacture, efficient in use, capable of long operating life and well adapted for the proposed use.

These and other features, advantages and objects of the present invention will be further understood and appreciated by those skilled in the art by reference to the following written specification, claims and appended drawings.

BRIEF DESCRIPTION OF THE DRAWINGS

FIG. 4 is an exploded perspective view of the rodent bait station; and

FIG. 5 is a perspective view of a removable interior portion of the rodent bait station with the housing and closure portions shown in phantom, as well as a rodent shown in phantom, and climbing to an upper level thereof.

DETAILED DESCRIPTION OF THE PREFERRED EMBODIMENTS

Figure 1:
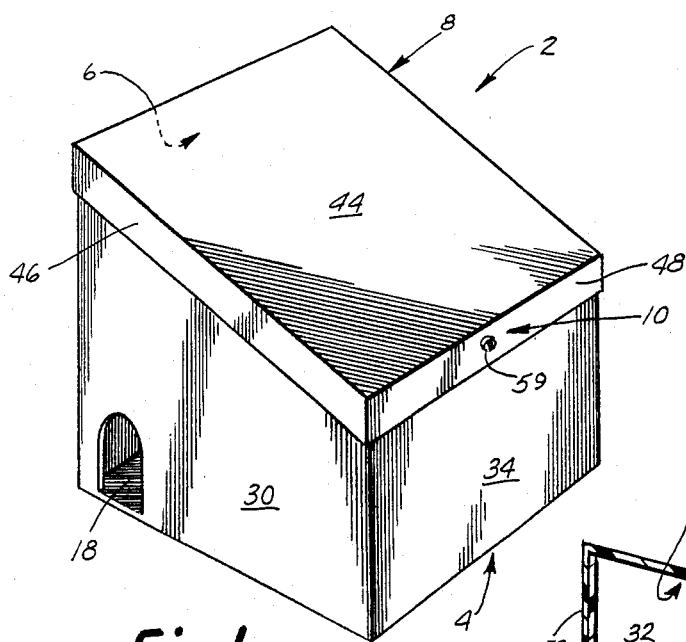
FIG. 1 is a perspective view of a rodent bait station embodying the present invention.

For purposes of description herein, the terms "upper," "lower," "right," "left," "rear," "front," "vertical," "horizontal" and derivatives thereof shall relate to the invention as oriented in FIG. 1. However, it is to be understood that the invention may assume various alternative orientations and step sequences, except where expressly specified to the contrary. It is also to be understood that the specific devices and procedures illustrated in the attached drawings, and described in the following specification, are simply exemplary embodiments of the inventive concepts defined in the appended claims. Hence, specific dimensions, and other physical characteristics relating to the embodiments disclosed herein are not to be considered as limiting, unless the claims by their language expressly state otherwise.

The reference numeral 2 (FIGS. 1–3) generally designates a rodent bait station embodying the present invention. The bait station 2 comprises a hollow housing 4 shaped to admit a plurality of rodents therein, and includes an access opening 6 adapted to service the bait station 2. The access opening 6 is selectively closed with a closure 8 including a releasable lock 10 to prevent inadvertent opening of the access opening 6. Mounted within the housing 4 is a partition 12 having a substantially horizontal orientation, and dividing at least a portion of the housing 4 into an upper level 14 and a lower level 16. An entry aperture 18 is disposed in the lower level 16 of the housing 4 and is shaped to permit rodents to enter and exit the bait station 2 therethrough. A first feed bin 20 is shaped to retain bait 21 therein, and is positioned in the lower level 16 of the housing 4 at a first feed area 22 disposed remote from the entry aperture 18. A second feed bin 24 is also shaped to retain bait therein, and is positioned in the upper level 14 of the housing 4 at a second feed area 26. A passageway 28 is disposed within the housing 4, and is shaped to permit rodents to ambulate therethrough. Passageway 28 extends from the first feed area 22 in the lower level 16 of the housing 4 to a location in the upper level 14 of the housing 4 which is remote from the second feed area 26, so as to allow rodents to travel freely between the upper level 14 and lower level 16 of the housing 4 for increased rodent feeding, while alleviating the tracking of bait from the bait station 2.

Rodent bait station 2 is particularly adapted for simultaneous use by many rodents. In the preferred embodiment, rodent bait station is constructed of polymeric materials, such as an acrylic or the like, so that station 2 is easy to handle, yet durable and easily adaptable to varying weather conditions. The bait station 2 is arranged to include the two feeding levels 14 and 16, without impairing the rodents ability to comfortably feed and ambulate in two distinct areas rather than just one. As discussed below, all apertures, walls, and feed bins are positioned for eliminating, or at least alleviating the possibility of having bait tracked out of the station subsequent to rodent feeding.

Housing 4 (FIG. 4) comprises a base 29, trapezoidal sidewalls 30, 32, a front wall 34 and a rear wall 36. In the present example, base 29, front wall 34 and rear wall 36 each have plan rectangular shapes, but in other embodiments they could just as easily assume square shapes. In the preferred embodiment, walls 30, 32, 34 and 36 are affixed to base 29 as best demonstrated in FIGS. 2–4 to define a hollow cavity 38. Trapezoidal walls 30 and 32 include upper edges 40 and 42, respectively, while front wall 34 and rear wall 36 include upper edges 54 and 56, respectively (FIG. 4). The upper edges 40, 42 of trapezoidal walls 30 and 32 are constructed to align with upper edge 54 of front wall 34 and upper edge 56 of rear wall 36 to define a slanted plane, i.e., access opening 6.

During use of bait station 2, access opening 6 is covered by closure 8 Closure 8 comprises a panel 44 to which side strips 46, 48, 50 and 52 are attached. Panel 44 should have an area great enough to completely cover opening 6 as well as sidewall edges 40, 42, 54 and 56. Side strips 46, 48, 50 and 52 are affixed to panel 44 in a downwardly extending orientation (FIGS. 2 and 3), so that upon placing closure 8 on opening 6, a snug fit is obtained, and the hollow cavity 38 of housing 4 is sealed on top (FIG. 1). The side strips 46 and 50, which are identical, have the plan shapes of parallelograms thus allowing the closure 8 to be closely fitted to the slanted plane defined by access opening 6. The slanted orientation of access opening 6 as covered by closure 8 prevents moisture and the like from collecting thereon. To insure that bait station 2 is not tampered with, a releasable lock mechanism 10 is secured to overlapping apertures 60 and 62 in side strip 48 and front wall 34, respectively. In the present example lock mechanism 10 (FIG. 2) comprises a snap pin 59 or the like. In an alternative embodiment, side strip 46 and front wall 34 could be secured together with a conventional lock (not shown) received by a hasp and hook (not shown) mounted on side strip 48 and front wall 34, respectively. The employment of a lock 58 assures that those unfamiliar with the function of the bait station, such as children, pets, and the like cannot access the housing 2 and thereby be exposed to the poisonous bait 21 therein.

Figure 2:
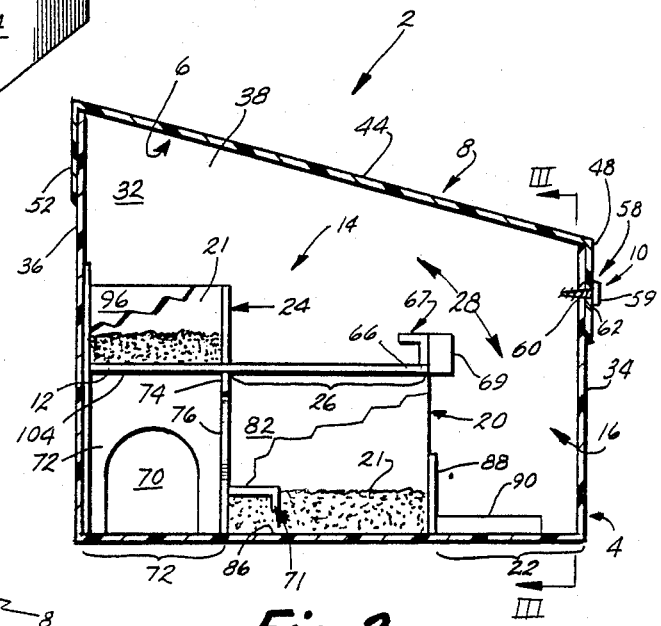
FIG. 2 is a vertical cross-sectional view of the rodent bait station.

Partition 12 is positioned in a horizontal orientation in hollow cavity 38 of housing 4 to define the upper level 14 and lower level 16 (FIG. 2). In the preferred embodiment, the partition 12, which has a rectangular shape and a substantially horizontal orientation, is part of a removable insert 64, as discussed below. The dimensions of partition 12 are such that partition 12 extends completely from trapezoidal wall 30 to trapezoidal wall 32, and extends partially from rear wall 36 to front wall 34. Partition 12 includes a free edge 66 that is positioned a preselected spaced apart distance from the front wall 34 to form a portion of passageway 28. The space between free edge 66 and front wall 34 should be great enough so that one or more rodents can comfortably ambulate therethrough, proceeding to upper level 14 if desired. To further prevent bait 21 from being tracked away from upper level 14 and out of bait station 2 a baffle 67 (FIG. 4), extending between trapezoidal walls 30 and 32, is mounted along free edge 66 and secured with reenforcing block 69. As best demonstrated in FIG. 2, baffle 67, which in the present example has a cross section resembling a split "T", is mounted so as to prevent any of bait 21 that is spilled out of upper feed bin 24 from being shifted down to lower level 16. While in the preferred embodiment partition 12 is removable from housing 4 in the manner discussed below, partition 12 can alternatively be conventionally affixed to trapezoidal walls 30, 32 and rear wall 36.

Disposed toward the rear of housing 2, within trapezoidal walls 30, 32 are two entry apertures 18 and 70 (FIG. 4). Since the bait station 2 is designed to attract rodents and the like, each of the entry apertures 18 and 70 should be large enough to allow a typically sized rodent to enter or exit from the same. It is vital, nonetheless, that entry apertures 18 and 70 should not be large enough to allow small children, pets, etc. communicate with any interior portion of bait station 2. Exposing anyone other than vermin to the poisonous bait contained in the bait station 2 would be highly undesirable since the bait contained therein is poisonous. The apertures 18 and 70 are remote from the first feed bin 20 and second feed bin 24 to prevent tracking of bait 21 from housing 4.

The portion of housing 4 associated with the entry apertures 18, 70, namely, entry area 72, is separated from first feed area 22 (FIG. 2), by a wall 74, having a substantially vertical orientation. Separating wall 74 extends between trapezoidal walls 30 and 32 (FIG. 3) and is positioned with respect to rear wall 36 so that a typically sized rodent may easily access the entry area 72. The separating wall 74, which is conventionally affixed to partition 12, includes apertures 76 and 78 allowing access to the first feed area 22 by the rodent. In the present example, apertures 76 and 78 are disposed adjacent to trapezoidal walls 30, 32 (FIG. 3), respectively, so that a rodent entering the first feed area 22 by either aperture 76 or 78 can easily ambulate around the first feed bin 20. Disposed directly beneath apertures 76 and 78 (FIGS. 2-4) and mounted on separating wall 74, are baffles 71 and 73. In the present example, baffle 71, which is identical to baffle 73, has a cross section resembling a split "T" rotated 90°. Baffles 71 and 73, which are positioned above base 29, serve to restrict any of bait 21 that might be spilled out of feed bins 20 and 24 to the base 29.

Figure 3:
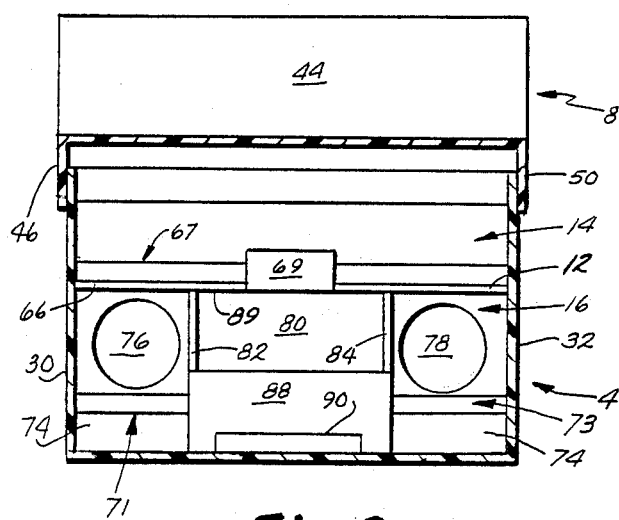
FIG. 3 is a vertical cross-sectional view of the rodent bait station taken along plane III—III of FIG. 2.

In the preferred embodiment, the first feed bin 20 is directly affixed to the partition 12 and separating wall 74 (FIG. 3). As demonstrated in FIGS. 3 and 4, first feed bin 22 comprises an associated portion 80 of separating wall 74, two sidewalls 82 and 84, a base 86 and a front wall 88. The sidewalls 82 and 84, are conventionally affixed, in a transverse orientation, on an underside portion 89 of partition 12 (FIG. 3) and the associated portion 80 of separating wall 74. The bin 20 is further defined by base 86 (FIG. 4) and a front wall 88 which are conventionally connected to sidewalls 82 and 84. Front wall 88 is just high enough so that rodents can easily access the poisonous bait 21 contained therein without pulling excess amounts of the same out of the bin 20 during feeding. While in the present example the first feed bin 20 is affixed to the partition 12 and associated portion 80 of separating wall 74, the bin 20 could also be mounted to the base 29 of housing 4. Mounting the first feed bin 20 on base 29, however, would make servicing of the housing 4 more difficult, and would be particularly undesirable since, in the preferred embodiment, partition 12 is removable. First feed bin 20 should not extend past the free edge 66 of partition 12 into passageway 28 (FIG. 3). In the present example, front wall 88 is located directly under the free edge 66 of partition 12.

The passageway 28 (FIG. 5) communicates the first feed area 22 with the second feed area 26 located in levels 16 and 14 respectively, and include a step 90. In the lower level 16, the first feed area 22 is disposed in front of first feed bin 20. In the present example, the second feed area 26 located in the upper level 14 extends between trapezoidal walls 30 and 32, as well as between the second feed bin 24 and free edge 66 of partition 12. Second feed bin 24 (FIGS. 4 and 5) is a rectangularly shaped trough, defined by walls 96, 98, 100 and 102 located near the rear of housing 4, and is conventionally mounted on a portion 104 of partition 12 (FIG. 2). By positioning second feed bin 24 toward the rear of partition 12, the distance between second feed bin 24 and free edge 66 is maximized, so that passageway 28 is as long as possible (FIGS. 2 and 5). When the length of passageway 28 is maximized, more rodents can ambulate between feed bins 20 and 24 thus facilitating increased rodent feeding. Moreover, by maximizing the length of passageway 28 the possibility of tracking bait from second feed bin 24 to either entry aperture 18 or entry aperture 70 is decreased.

In the preferred embodiment, the step 90 is positioned in passageway 28 adjacent front wall 88, and assists the rodent in climbing between the lower level 16 to the upper level 14 (FIG. 5). It is important that step 90 be no higher than front wall 88, so that first feed bin 20 is accessible for feeding. Yet step 90 is preferably high enough so that when the rodent steps on the step 90 and grasps free edge 66, as illustrated in FIG. 5, the rodent can ascertain the existence of second feed area 26. Step 90 not only facilitates rodent movement between levels 14 and 16, but also serves as a stop member for the removable insert 64. As best shown in FIG. 2, the rear wall of step 90 abuts the removable insert 64 at front wall 88. Step 90 securely retains removable insert 64 fixed in a designated orientation within housing 4, and prevents sliding in any direction therein (FIG. 5).

In the preferred embodiment, partition 12 is conventionally affixed to feed bins 20 and 24, as well as separating wall 74 and a rear entry area wall 108 to form a single removable unit (FIG. 3) for convenient servicing of rodent bait station 2. Additionally, trough wall 102 and rear entry area wall 108 are integrated into a single insert rear wall 110 (FIG. 4). Insert rear wall 110 provides stability to insert 64 so that when the rodent presses down on edge 112 of front wall 88 or on the free edge 66 of partition 12, the insert 64 cannot be torqued about its center since rear insert wall 110 abuts rear wall 36 (Fig. 5).

METHOD OF ASSEMBLY

In the preferred embodiment of the rodent bait station 2, hollow housing 4 with entry apertures 18 and 70 therein, closure 8, insert 64 and step 90 are preassembled. Use of insert 64 in assembly is preferable to simply mounting partition 12, feed bins 20 and 24, and separating wall 74 into housing 4 with an adhesive, since permanent mounting of the components would impair convenient servicing of the bait station 2. Each of the components employed to construct station 2 can be cut out of a sheet of the polymeric material or individually molded.

In the preferred embodiment, feed bins 20 and 24 of insert 64 are partially filled with bait 21, and insert 64 is positioned behind step 90 as indicated in FIG. 5. Closure 8 is then placed over access opening 6 so that apertures 60 and 62 align, and snap pin 59 is inserted through apertures 60 and 62 to secure closure 8 onto housing 4, so that bait 21 cannot be tampered with or housing 4 inadvertently opened. The locked bait station 2 is placed in a vicinity by which rodents are known to pass in anticipation of their entering and feeding in the rodent bait station 2. Periodically the bait station 2 should be opened and insert 64 removed in order to clean housing 4 and replenish feed bins 20 and 24, so that station 2 remains an attractive location in which rodents can feed and conveniently ambulate therethrough.

Due to the construction of rodent bait station 2 it is easy to manufacture and convenient to maintain without the need to disassemble any basic parts. Upon removing closure 8, the bait station 2 can be cleaned up and replenished in a minimum number of steps. Due to the fact that access opening 6 has a substantially slanted orientation, moisture, such as rain or snow gravitationally slides off of closure 8 thus allowing easy access to the hollow cavity 38 of housing 4 at all times. Rodent bait station 2 is convenient to maintain, capable of affording feeding facilities to many rodents at once, and particularly rugged, yet simple in construction. The bait station 2 should be particularly effective in attracting rodents thereto since it is spacious, having two levels, rather than one, upon which the rodents can ambulate and feed. Despite its roominess, the bait station 2 is designed to eliminate or at least alleviate, the possibility of losing any bait from the feed bins 20 or 24. Rodent movement through passageway 28 is facilitated by the existence of step 90, which also serves to position insert 64. The unitary construction of insert 64 allows for quick, yet full service of bait station 2.

In the foregoing description, it will be readily appreciated by those skilled in the art that modifications may be made to the invention without departing from the concepts disclosed herein. Such modifications are to be considered as included in the following claims unless the claims by their language expressly state otherwise.

The embodiments of the invention in which an exclusive property or privilege is claimed are defined as follows:

1. A bait station for rodents and the like, comprising:
a hollow housing shaped to permit admission of a plurality of rodents therein, and including an access opening adapted to service said bait station;
a closure selectively closing said access opening, and including a releasable lock to prevent inadvertent opening of said access opening;
a partition mounted in said housing in a substantially horizontal orientation, and dividing at least a portion of said housing into upper and lower levels;
an entry aperture disposed in the lower level of said housing, and shaped to permit rodents to enter and exit said bait station therethrough;
a first feed bin adapted to retain bait therein, and positioned in the lower level of said housing at a first feed area disposed remote from said entry aperture;
a separating wall extending between said first and second levels, disposed between said entry aperture and said first feed area; and including an aperture shaped slightly larger than the rodents;
a second feed bin adapted to retain bait therein, and positioned in the upper level of said housing at a second feed area;
a passageway disposed within said housing, shaped to permit rodents to ambulate therethrough, and extending from said first feed area in the lower level of said housing to a location in the upper level of said housing, remote from said second feed area, whereby rodents may travel freely between the upper and lower levels of said housing for increased rodent feeding, while alleviating the tracking of bait from said bait station.

2. A bait station as set forth in claim 1, wherein:
said housing includes a base, and a plurality of sidewalls upstanding therefrom; and
said partition includes a free edge positioned a preselected spaced apart distance from an associated one of said sidewalls to define an opening portion of said passageway through which rodents travel between the upper and lower portions of said housing.

3. A bait station as set forth in claim 2, wherein:
said partition free edge is positioned directly above said first feed area.

4. A bait station as set forth in claim 3, including:
a baffle extending along said partition free edge and being mounted thereto for preventing any bait that spills out of said second feed bin from being tracked out of said bait station.

5. A bait station as set forth in claim 4, including:
a step positioned on the first level of said housing directly below said partition opening to assist rodents in climbing between first and second levels of said housing.

6. A bait station as set forth in claim 5, including:
a second baffle disposed directly beneath said aperture; said second baffle being connected to said separating wall and having a substantially horizontal orientation thereby functioning as a barrier to any bait that may be tracked from said feed bins, yet allowing the rodents to pass through said aperture without being impaired by said second baffle.

7. The bait station as set forth in claim 6, wherein:
said partition, said feed bins, and said separating wall are interconnected to form a removable unit which allows periodic maintenance of said bait station by removal of said removable unit.

8. The bait station as set forth in claim 7, wherein:
said step abuts said removable unit to provide a stop that prevents said removable unit from sliding out of a designated position within said housing.

9. A bait station as set forth in claim 8, including:
a second aperture disposed in said separating wall to allow rodents to enter said first feed area from either of said first and second apertures.

10. A bait station as set forth in claim 9, including:
a third baffle disposed directly beneath said second aperture; said third baffle being connected to said separating wall and having a substantially horizontal orientation thereby functioning as a barrier to any bait that may be tracked from said feed bins, yet allowing the rodents to pass through said second aperture without being impaired by said third baffle.

11. A bait station as set forth in claim 1, wherein:
said closure is inclined to gravitationally shed rain, snow or the like.

12. A bait station as set forth in claim 1, including:
a step positioned on the first level of said housing directly below said partition opening to assist rodents in climbing between first and second levels of said housing.

13. A bait station as set forth in claim 1, including:
a baffle extending along said partition free edge and being mounted thereto for preventing any bait that spills out of said second feed bin from being tracked out of said bait station.

14. A bait station as set forth in claim 1, wherein:
said closure is inclined to gravitationally shed rain, snow or the like.

15. A rodent bait station comprising:
a hollow housing, including a base and a plurality of sidewalls upstanding therefrom, shaped to permit admission of a plurality of rodents therein, said hollow housing also including an access opening adapted to service said bait station;
a closure selectively closing said access opening and including a releasable lock to prevent inadvertent opening of said access opening;
a removable insert selectively received in said housing including a wall having a substantially vertical orientation and an aperture therein shaped slightly larger than a rodent, said wall dividing said housing into an entry area large enough to admit said rodent, and a feed area having a feed bin attached to said wall whereby said rodent enters and exits said feed area by said aperture, and said insert is removable for convenient maintenance of said bait station;

a partition mounted on an edge of the dividing wall in a substantially horizontal orientation and dividing at least a portion of said housing into upper and lower levels; said partition including a free edge positioned a preselected spaced apart distance from an associated one of said sidewalls to define an opening portion of said passageway through which rodents travel between the upper and lower portions of said housing for increased rodent feeding.

16. A bait station as set forth in claim 15, including:
a baffle disposed directly beneath said aperture; said baffle being connected to said substantially vertically oriented wall and having a substantially horizontal orientation thereby functioning as a barrier to any bait that may be tracked from said feed bins, yet allowing the rodents to pass through said aperture without being impaired by said baffle.

17. A bait station as set forth in claim 16, including:
a second baffle extending along said partition free edge and being mounted thereto for preventing any bait that spills out of said second feed bin from being tracked out of said bait station.

18. A rodent bait station as set forth in claim 17, including:
a second feed bin adapted to retain bait therein, and positioned in the upper level of said housing at a second feed area.

19. A rodent bait station as set forth in claim 18, including:
a step positioned on the first level of said housing directly below said partition opening to assist rodents in climbing between first and second levels of said housing.

20. A rodent bait station as set forth in claim 19, wherein:
said step abuts said insert thereby functioning as a stop that prevents the unit from sliding out of a designated position.

21. A bait station for rodents and the like, comprising:
a hollow housing shaped to permit admission of a plurality of rodents therein, and including an access opening adapted to service said bait station;

a closure selectively closing said access opening, and including a releasable lock to prevent inadvertent opening of said access opening;

a partition mounted in said housing in a substantially horizontal orientation, and dividing at least a portion of said housing into upper and lower levels;

an access aperture disposed in the lower level of said housing, and shaped to permit rodents to enter and exit said bait station therethough;

said access aperture functioning as both an entrance and an exit through which the rodents access said bait station;

a first feed bin adapted to retain bait therein, and positioned in the lower level of said housing at a first feed area disposed remote from said access aperture;

a second feed bin adapted to retain bait therein, and positioned in the upper level of said housing at a second feed area;

a passageway disposed within said housing, shaped to permit rodents to ambulate therethrough, and extending from said first feed area in the lower level of said housing to a location in the upper level of said housing, remote from said second feed area, whereby rodents may travel freely between the upper and lower levels of said housing for increased rodent feeding, while alleviating the tracking of bait from said bait station.

* * * * *